United States Patent
Brew et al.

(10) Patent No.: US 9,524,223 B2
(45) Date of Patent: Dec. 20, 2016

(54) PERFORMANCE METRICS OF A COMPUTER SYSTEM

(71) Applicant: International Business Machines Corporation, Armonk, NY (US)

(72) Inventors: Anthony T. Brew, Cork (IE); Laura Flores Sánchez, Munich (DE); Paul J. Murphy, Seattle, WA (US); Michele Palmia, Berlin (DE); Anthony W. Ward, Mallow (IE)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 14/456,626

(22) Filed: Aug. 11, 2014

(65) Prior Publication Data

US 2015/0046757 A1 Feb. 12, 2015

(30) Foreign Application Priority Data

Aug. 12, 2013 (GB) .................................. 1314375.5

(51) Int. Cl.
 *G06F 11/00* (2006.01)
 *G06F 11/34* (2006.01)
(52) U.S. Cl.
 CPC ....... *G06F 11/3409* (2013.01); *G06F 11/3452* (2013.01)
(58) Field of Classification Search
 USPC ....................................................... 714/47.1
 See application file for complete search history.

(56) References Cited

U.S. PATENT DOCUMENTS

| | | | |
|---|---|---|---|
| 7,280,988 B2 | 10/2007 | Helsper et al. | |
| 7,437,446 B2 | 10/2008 | Bailey et al. | |
| 8,078,913 B2 | 12/2011 | Goldszmidt et al. | |
| 8,346,914 B2 | 1/2013 | Vaidyanathan et al. | |
| 2003/0110007 A1 | 6/2003 | McGee et al. | |
| 2004/0039968 A1 | 2/2004 | Hatonen et al. | |
| 2004/0088406 A1 | 5/2004 | Corley et al. | |
| 2007/0220371 A1 | 9/2007 | Duyanovich et al. | |
| 2008/0016412 A1* | 1/2008 | White | G06F 11/3409 714/48 |
| 2009/0182866 A1* | 7/2009 | Watanabe | G06F 11/3495 709/224 |
| 2009/0222549 A1 | 9/2009 | Gilbert et al. | |

(Continued)

OTHER PUBLICATIONS

"Market Basket Analysis," Angoss Software Corporation, copyright 2012, 3 pages. Accessed Jul. 8, 2014, http://www.angoss.com/wp-content/uploads/2011/10/Market_Basket_Analysis1.pdf.

(Continued)

*Primary Examiner* — Sarai Butler
(74) *Attorney, Agent, or Firm* — Yee & Associates, P.C.; Richard A. Wilhelm (57) ABSTRACT

Identifying an inter-relationship between performance metrics of a computer system. It is proposed to convert performance metric signals, which represent variations of performance metrics over time, into quantized signals having a set of allowable discrete values. The quantized signals are compared to detect a correlation based on the timing of variations quantized signals. An inter-relationship between the performance metrics may then be identified based on a detected correlation between the quantized signals.

20 Claims, 5 Drawing Sheets

(56) References Cited

U.S. PATENT DOCUMENTS

2012/0311387 A1* 12/2012 Santhosh ............ G06F 11/3433
  714/33
2013/0151907 A1* 6/2013 Nakagawa .......... G06F 11/3452
  714/47.1

OTHER PUBLICATIONS

Rao et al., "Implementation of Anomaly Detection Technique Using Machine Learning Algorithms," International Journal of Computer Science and Telecommunications, vol. 2, No. 3, Jun. 2011, pp. 25-31.

* cited by examiner

PERFORMANCE METRICS OF A COMPUTER SYSTEM

CROSS-REFERENCE TO RELATED APPLICATIONS

This application claims the benefit of priority to United Kingdom Patent Application No. GB1314375.5, filing date Aug. 12, 2013, the contents of which are hereby incorporated by reference.

FIELD OF THE INVENTION

This invention relates to the field of computer systems and more particularly to the inter-relationship of performance metrics of a computer system.

BACKGROUND

Performance metrics, also known as Key Performance Indicators (KPIs), are used to measure the health of computer systems. These performance metrics can include measurements such as CPU usage, memory usage, free space or response time. The performance metrics may be collected from a large number of devices within a computer system and then used to measure the overall health of the system.

Due to the complexity of modern computer systems, it may be necessary to monitor large numbers of performance metrics, ranging from relatively high-level metrics, such as transaction response time, throughput and availability, to low-level metrics, such as amount of physical memory in use on each computer on a network, amount of available disk space, or the number of threads executing on each processor of each computer. Metrics relating to the operation of database systems and application servers, physical hardware network performance, etc., may all need to be monitored across networks that may include many computers (each executing numerous processes) so that problems can be detected (preferably before they arise).

It will therefore be appreciated that a computer system may have a seemingly endless range of performance metrics, and the performance metrics are not necessarily measured in a common scale or range.

Due to the complexity and potential number of performance metrics involved, it can be useful to only call attention to metrics that indicate there may be abnormalities in system operation, so that an operator or the system does not become overwhelmed. Unfortunately, the sheer number of performance metrics, their complexity and their interrelations mean that existing analysis techniques are not adequate.

For example, an existing approach comprises a user manually specifying which performance metrics are related to a particular or importance performance metric. This can be time consuming, expensive and error prone. Furthermore, with system or network topology frequently changing, such information can quickly become obsolete.

It is also known to employ the Granger causality algorithm to detect if one performance metric has causal influence over another one, based on the values of the two performance metrics. This, however, may not capture all dependencies or relationships between performance metrics. By way of example, a first performance metric called System Health may be at a constant 100%, and a second performance metric called Network Traffic may fluctuate up and down. During a system anomaly, both of these values may become anomalous, but the Granger causality score would be low because most of the time, network traffic did not have any impact on system health.

BRIEF SUMMARY OF THE INVENTION

There is proposed a concept for identifying dependencies or relationships between performance metrics of a computer system. The concept uses the idea that performance anomalies occurring within close temporal proximity may have a common root cause. By analysing performance metrics to detect a correlation between the timing of variations or anomalies in the performance metrics, an inter-relationship or dependency between the performance metrics may be identified. For example, if analysis shows that a database server and front end server consistently become anomalous together, it may be determined that there is a high likelihood they are sharing some dependency.

Analysis of performance metrics to detect a correlation may be made more efficient and/or simple by focussing attention on the timing of anomalies rather than actual values of performance metrics. Signals representing the variation of performance metrics over time may be quantized into signals having a greatly reduced set of allowable values, such as binary signal indicating the existence or non-existence of an anomaly for example. In this way, a binary signal for each performance metric may be obtained, and these binary signals can be quickly and easily compared to identify the existence of any relationships between the timing of anomalies. Thus, it will be appreciated that proposed embodiments may take a signal (representing detected values of a performance metric at regular time intervals for example) which may be limited to a first set of allowable values (due to it being a digital signal and/or the resolution/accuracy of the value detector for example) and quantize the signal into a second signal having a greatly reduced number of allowable values. The greatly reduced number of allowable values may preferably comprise less than ten values, more preferably less than five values, and even more preferably two values. Thus, the (quantized) second signal may simply indicate the occurrence of an anomaly and, for embodiments where the number of allowable values is greater than two, the signal may further indicate the severity of the anomaly by ranking it to one of a plurality of values or levels.

According to an aspect of the invention, there is provided a method of identifying an inter-relationship between performance metrics of a computer system, the method comprising the steps of: obtaining a first metric signal for a first performance metric, the first metric signal representing a variation of the first performance metric over time; obtaining a second metric signal for a second performance metric, the second metric signal representing a variation of the second performance metric over time; converting the first metric signal into a first quantized signal having a first set of allowable discrete values; converting the second metric signal into a second quantized signal having a second set of allowable discrete values; detecting a correlation between the first and second quantized signals based on the timing of variations in the first and second first and second quantized signals; and identifying an inter-relationship between the first and second performance metrics based on the detected correlation between the first and second first and second quantized signals.

Embodiments may identify an inter-relationship between performance metrics by detecting a correlation between the timing of anomaly occurrences in the performance metrics. Embodiments may thus be used to determine which performance metrics are associated with a particular key performance metric, for example, and this may provide information on the cause of an alarm or other event involving the key performance metric. It may also indicate which performance metrics may be monitored to provide advance warning of an undesirable event involving a key performance metric.

The first and second metric signals may represent a variation of the first and second performance metrics, respectively, over a common time period. Proposed embodiments need not be concerned about actual values of performance metrics, but instead focus on the idea that simultaneously occurring anomalies (or even anomalies occurring within a close temporal proximity) may be related to each other. By focussing attention on the timing of anomaly occurrence rather than actual recorded value of performance metrics, it may be easier and/or quicker to identify inter-relationships between performance metrics. This may enable a large number of performance metrics to be efficiently analysed for the detection of inter-dependencies.

The first set of allowable discrete values may consist of first and second values, and converting the first metric signal into a first quantized signal may comprise approximating a value of the first metric signal at a time instant to the second value if it exceeds a predetermined threshold. Accordingly, embodiments may greatly reduce a number of possible values of a performance indicator or metric signal so as to make analysis and/or comparison easier.

Converting a metric signal into a quantized signal may comprise quantizing the metric signal by approximating a value of the metric signal at a time instant to one of a discrete set of allowable values.

An anomaly may be unexpected behaviour of one or more performance metrics within a system and may have a negative impact on the systems health.

Information regarding identified inter-relationships between performance metrics may be provided to a user and/or used in other algorithms. Such information may be used to reduce the number of performance metrics monitored in a system, which may provide a reduction in monitoring cost or complexity.

Also, embodiments may be used to correlate and/or group performance metrics to assist determination or detection of existing or probable abnormalities. Thus, there may be provided a way of automatically mapping closely related metrics within computer systems and/or automatically detecting the probable occurrence of a system abnormality before it occurs. Advance warning of a potential abnormality may therefore be provided by some embodiments. This may lead to a reduction in the number of performance metrics monitored as, for example, it may be identified that an Alarm on a first performance metric always proceeds an alarm on a second performance metric, leading to the decision that the second performance metric need not be monitored. In a system monitoring multiple performance metrics where alarms are routed to different operators, relationships found between performance metrics may be used to route related alarms to the same user, or used to group alarms automatically together. Information about identified relationships may also be used to provide a contextual information enabling users to see common downstream problems and to monitor the current state of these performance metrics before a situation becomes critical.

According to another aspect of the invention, there is provided a computer program product for identifying an inter-relationship between performance metrics of a computer system.

According to yet another aspect of the invention, there is provided a system for identifying an inter-relationship between performance metrics.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

It is proposed to convert performance metric signals into respective quantized signals having a greatly reduced set of allowable values (compared to the respective original performance metric signals). The quantized signals could be as simple as a binary signal (indicating anomalous or non-anomalous for example), or could be slightly more complex such as allowing four values which may indicate severity of anomaly. The quantized signals for the same or similar time periods can then be compared to identify when variations in the signals occur at the same time (or at close temporal proximity) which may indicate inter-relationship exists between the respective performance metrics. A large number of quantized signals may be quickly compared, and simultaneous or closely occurring anomalies identified. Also, by dealing with discrete values, data that is not anomalous may be easily ignored and processing requirements may be reduced.

Proposed embodiments may have the advantage of not requiring actual performance metric values to be correlated. Also embodiments may enable the direction of direction of a dependency (e.g. which performance metric depends on which) to be easily determined.

Inter-related performance metrics may then be presented to a user for further investigation or they may be used by an automated algorithm to reduce the number of monitored performance metrics. Also, if a user wishes to understand the effects of an anomaly in a key performance metric, simply selecting that component via a user interface may indicate which other performance metrics are related to the key performance metric.

Figure 1:
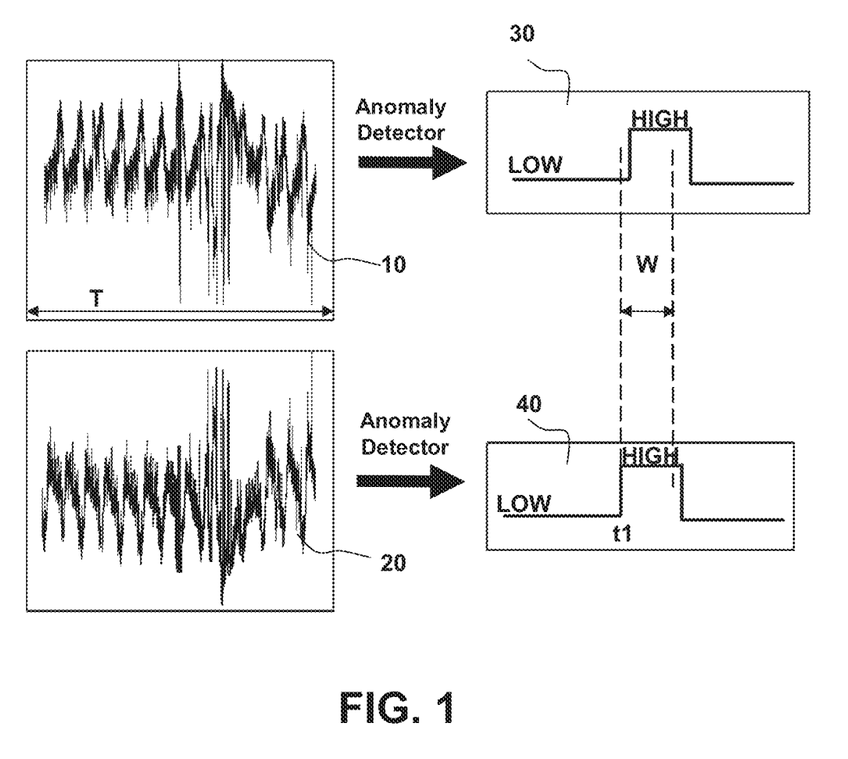
FIG. 1 illustrates a method of identifying an inter-relationship between performance metrics of a computer system according to an embodiment.

Referring to FIG. 1, there is illustrated an embodiment of the invention. First and second performance metric signals 10 and 20 are obtained. The first metric signal 10 is a signal representing a variation of the first performance metric over a predetermined time period T, and the second performance metric signal 20 represents a variation of the second performance metric over the same time period T. It will therefore be appreciated that the first and second performance metric signals may be the signals obtained from first and second system detectors, respectively. These signals may therefore be continuous analogue signals (having an infinite range of possible values) or they may be digital signals having a range of possible values dictated by the accuracy/resolution of the detector.

The first and second performance metric signals 10 and 20 are converted into quantized signals which may more clearly identify the occurrence of one or more anomalies in the performance metric.

The first performance metric signal 10 is converted into a first quantized signal 30 having two allowable discrete values. The two allowable values are used to represent either the occurrence or non-occurrence of an anomaly in the first performance metric signal 10. The first allowable value is a 'logical low', which indicates the non-occurrence of an anomaly, and the second allowable value is a 'logical high', which indicates the occurrence of an anomaly. Converting the first performance metric signal 10 into the first quantized signal 30 may, for example, comprise quantizing the first performance metric signal 10 by approximating a value (such as magnitude or rate of change, for example) of the first performance metric signal 10 at every time instant to one of two allowable values ('logical low' or 'logical high').

Approximating a value to one of the two values may comprise comparing the value with a predetermined threshold value which indicates the occurrence of an anomaly, wherein if the value is less than the predetermined threshold value non-occurrence of an anomaly is concluded and the value is approximated to the 'logical low' value. Conversely, if the value is equal to or exceeds than the predetermined threshold value, occurrence of an anomaly is concluded and the value is approximated to the 'logical high' value. Accordingly, in this example, conversion of the first performance metric signal 10 into a first quantized signal 30 may be seen as an anomaly detection process which detects when the first performance metric signal 10 is indicating the occurrence of an anomaly in the first performance metric.

Similarly, the second performance metric signal 20 is converted into a second quantized signal 40 having two allowable discrete values. The two allowable values are used to represent either the occurrence or non-occurrence of an anomaly in the second performance metric signal 20. The first allowable value is a 'logical low', which indicates the non-occurrence of an anomaly, and the second allowable value is a 'logical high', which indicates the occurrence of an anomaly. Converting the second performance metric signal 20 into the second quantized signal 40 may, for example, comprise quantizing the second performance metric signal 20 by approximating a value (such as magnitude or rate of change, for example) of the second performance metric signal 20 signal at every time instant to one of two allowable values ('logical low' or 'logical high').

Approximating a value to one of the two values may comprise comparing the value with a predetermined threshold value which indicates the occurrence of an anomaly, wherein if the value is less than the predetermined threshold value non-occurrence of an anomaly is concluded and the value is approximated to the 'logical low' value. Conversely, if the value is equal to or exceeds than the predetermined threshold value, occurrence of an anomaly is concluded and the value is approximated to the 'logical high' value. Accordingly, in this example, conversion of the second performance metric signal 20 into a second quantized signal 40 may be seen as an anomaly detection process which detects when the second performance metric signal 20 is indicating the occurrence of an anomaly in the second performance metric.

The first and second quantized signals 30 and 40 are then compared to detect a correlation between the first and second quantized signals 30 and 40. This comparison may be made by identifying the timing of variations in the first and second quantized signals 30 and 40 and assessing their temporal proximity to each other.

Inter-relationship between the first and second performance metrics may then be identified based on the detected correlation between the first and second first and second quantized signals.

Such embodiments may therefore be used to determine which performance metrics are associated with a particular key performance metric, for example, and this may provide information on the cause of an alarm or other event involving the key performance metric.

For example, a change from logical low to logical high in both the first and second quantized signals 30 and 40 within a small predetermined time window W (following the point in time t1 that the first change is detected) may indicate that the second performance metric is dependent on the first performance metric. If the second performance metric is a KPI, this identification of dependency could indicate that occurrence of an anomaly in the first performance metric is a pre-cursor to the occurrence of an anomaly in the KPI. Detecting the occurrence of an anomaly in the first performance metric may therefore be used as an advance warning signal ahead of an anomaly occurring in the KPI. Thus, a warning signal may be communicated and corrective action undertaken so as to either prevent anomaly occurring in the KPI or reduce a resultant effect of the expected anomaly in the KPI.

Considering further embodiments, a brief explanation of graph data structure will now be provided for an improved understanding.

Figure 2:
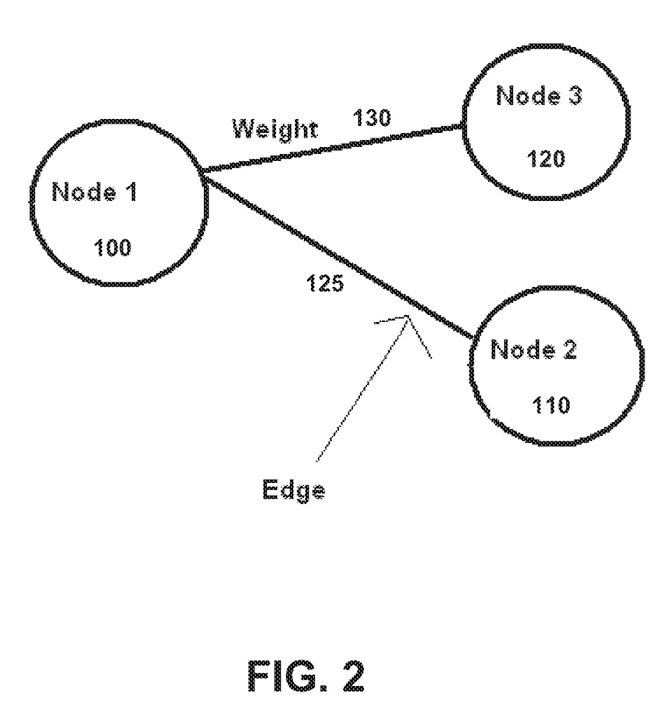
FIG. 2 shows an exemplary graph illustrating a relationship between three objects.

A data structure known as a graph is a useful way of describing relationships between objects. FIG. 2 shows an exemplary graph illustrating a relationship between three objects. The graph comprises first 100 to third 120 circles known as nodes. In the context of this disclosure, a node may be used to represent a performance metric of a computer system. A first line 125, known as an edge, is connected between the first and second nodes 100 and 110 and is used to describe the relationship between the first and second nodes 100 and 110. A second line 130, known as an edge, is connected between the first and third nodes 100 and 120 and is used to describe the relationship between the first and third nodes 100 and 120.

These edges 15,130 can have a weight attached to them, and edges with higher weights are worth more (e.g. have a higher importance) than those with lower ones.

In the example of FIG. 2, the first and second nodes 100 and 110 are referred to as neighbors because there is a direct edge 125 connecting then. Similarly, the first and third nodes 100 and 120 are referred to as neighbors because there is a direct edge 130 connecting them. Because there is no direct edge connecting the second and third nodes 110 and 120, they are not neighbors.

As will be seen for the first node 100, there can be multiple edges attached to a single node.

Figure 3:
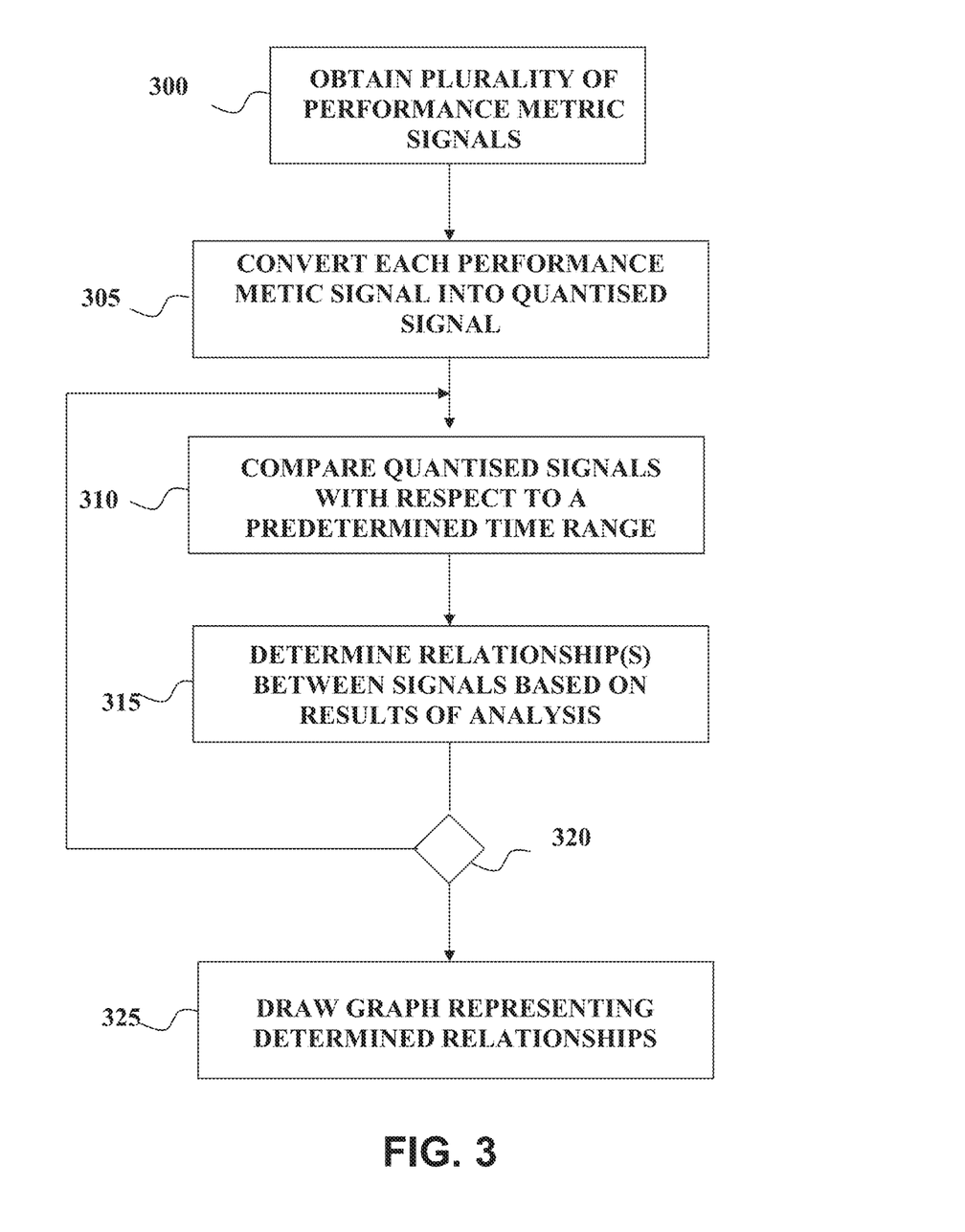
FIG. 3 is a flow diagram of a method according to an embodiment of the invention.

Referring now to FIG. 3, there is shown a flow diagram of an embodiment of the invention. The method starts in step 300 wherein a plurality of performance metric signals is obtained from a computer system. Each performance metric signal represents the variation of a performance metric of the computer system over predetermined time period, say 24 hours for example. Purely by way of example, each signal may be obtained from a respective detection unit with the computer system, or from a central monitoring unit which is adapted to monitor numerous performance metrics of the computer.

Next, in step 305, each of the plurality of performance metric signals is transformed into a binary signal, wherein the value a binary signal (at a time Tn) indicates whether or not a value of the respective performance metric signal indicates the occurrence or non-occurrence (at time Tn). Such transformation of a performance metric signals into a binary signal may be undertaken by an anomaly detection unit which analyses a signal and outputs a value of '1'/'Logical High' or '0'/'Logical Low' depending on whether an anomaly is detected or not. For example, such an anomaly detection unit may be arranged to output a value of '1'/'Logical High' only if an anomaly is detected, otherwise a value of '0'/'Logical Low' is output, resulting in a binary signal that indicates the occurrence of an anomaly by having a value of '1'/'Logical High'.

Then, in step 310, binary signals are compared for a user-defined time window, wherein it is considered that anomalies occurring within that time are overlapping or occur simultaneously. For example, for signals obtained over a 24 hour period, a one hour time window length may be used wherein it would be considered that anomalies occurring in the same one hour window occurred 'simultaneously'. Of course, other time window length may be used to detect simultaneously occurring anomalies. By way of example, a time window length of less than one second may be employed to detect anomalies that occurred at the same time.

Based on the comparison results, the relationship(s) between signals is/are determined in step 315. For example, where it is identified that first and second binary signals changed from a value of '0'/'Logical Low' to a value of '1'/'Logical High' within a predetermined time window, it may be determined that the first and second binary signal are related and it may be further determined which signal is dependent on which by analysing which signal was the first to change from a value of '0'/'Logical Low' to a value of '1'/'Logical High'.

After determining the relationship(s) between the signals compared in step 310, the method continues to step 320 wherein it is checked if more quantized signals are to be compared. If in step 320 it is determined that more quantized signals are to be compared, the method returns to step 310 and the process of comparison (step 310) and relationship determination (315) is undertaken once again. If in step 320 it is determined that no more quantized signals are to be compared, the method continues to step 325 when a graphic representation of the determined relationships is created.

Step 325 of creating a graphic representation of the determined relationships may, for example, comprise the creation of graph similar to that of FIG. 2 for example. An exemplary algorithm for creating such as graph may be as follows:
i Obtain a list of the performance metrics that have been simultaneously anomalous (e.g. those being anomalous within a predetermined time window);
ii Create nodes representing all the anomalous performance metrics of the list (for those that do not have nodes already);
iii For each anomalous performance metric of the list, do as follows:
  (a) Insert a new edge in the graph from the current performance metric node to all the other currently/simultaneously anomalous performance metric nodes;
  (b) If the edge above in (a) exists already, increase the weight of that edge by 1; and
  (c) Increase a counter that represents the number of times the currently performance metric has been anomalous iv If no previous anomaly has occurred within this time window, increase the total anomaly counter by one.

Figure 4:
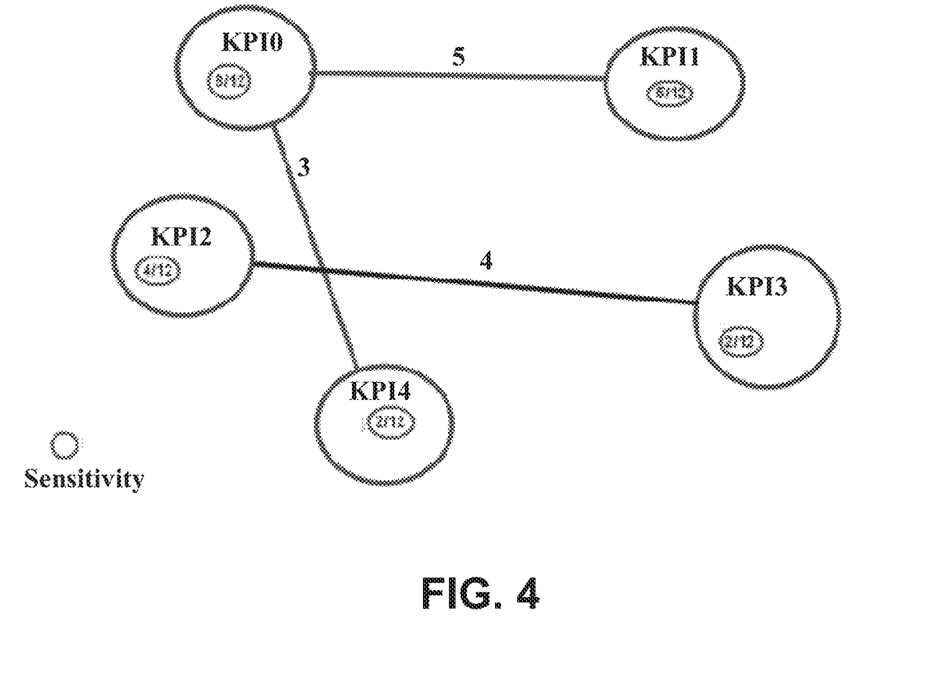
FIG. 4 a graph representing the inter-relationships between performance metrics as determined according to an embodiment of the invention.

Running the above algorithm may provide a graph representing the inter-relationships between performance metrics as shown in FIG. 4.

The structure of such a graphical representation may make a number of properties of performance metrics apparent. For example:
  The number of edges attached to a node indicates the number of dependant performance metrics (in either direction);
  Each edge represents anomaly that occurred in the performance metrics it connects and within a predetermined time window. For example, from FIG. 4 it can be derived that KPI0 and KPI1 had simultaneous anomalies, but KPI4 and KPI1 never did. This may indicates that KPI4 and KPI1 do not share a dependency. If, however, at a later point KPI4 and KPI1 do have an overlap, the weight of the edge would be low compared to the other edges in the graph, indicating a weak link between the two;
  The total number of times a performance metric has been anomalous may indicate its sensitivity. In the example of FIG. 4, if an anomaly was to happen in general, it may have an 8/12 chance of affecting KPI0;
  The weight of a specific edge over the sum of weights attached to a node may indicate the likelihood of an anomaly affecting the neighbor attached to the edge. As an example, the edge weight between KPI0 and KPI1 has a weight of 6. From historic data, if KPI1 is anomalous there may be a 5/5 chance that KPI0 will be affected. The reverse may not be true—if KPI0 is anomalous, there may be a 5/8 chance that KPI1 will be affected. This indicates that KPI0 is dependent on KPI1 but not vice-versa;
  The recording of anomaly occurrence times may also aid identifying and mapping dependencies. For example, if KPI1 constantly becomes anomalous before KPI0, it may indicate that KPI0 has a dependency on KPI1, and, in such a situation, the detection of an anomaly in KPI1 may be used to provide an advance warning of an anomaly in KPI0.

The generated graphic representation may be presented to a user, allowing him/her to find high risk areas, and dependencies between performance metrics. Anomaly alarms can also be merged together if a group of performance metrics have been consistently anomalous in the past.

Information about identified relationships could be provided to a system administrator for review or analysis. The system administrator may decide to stop monitoring performance metrics that are seen to be duplicates or effectively measured by alternative performance metrics in the system. A number or monitored performance metrics may therefore be reduced. Further, complexity and/or cost savings may be achieved by allowing for only the monitoring of performance metrics that are easier and/or cheaper to monitor but which may have inter-dependencies with other performance metrics (that are more difficult and/or more expensive to monitor).

If enough support is found for a given relationship between performance metrics, the relationship may be used, for example, to automatically suppress or group alarms on commonly related performance metrics, or to increase the severity of an alarm that is known to impact multiple performance metrics.

Contextual information may also be added to an alarm or warning signal generated in respect of a given performance metric. By way of example, a warning signal may comprise information as follows: "KPH is currently alarming and is commonly impacted at the same or similar time(s) as KPI0. It commonly happens as a precursor to KPI0 and generally happens after KPI2"

Figure 5:
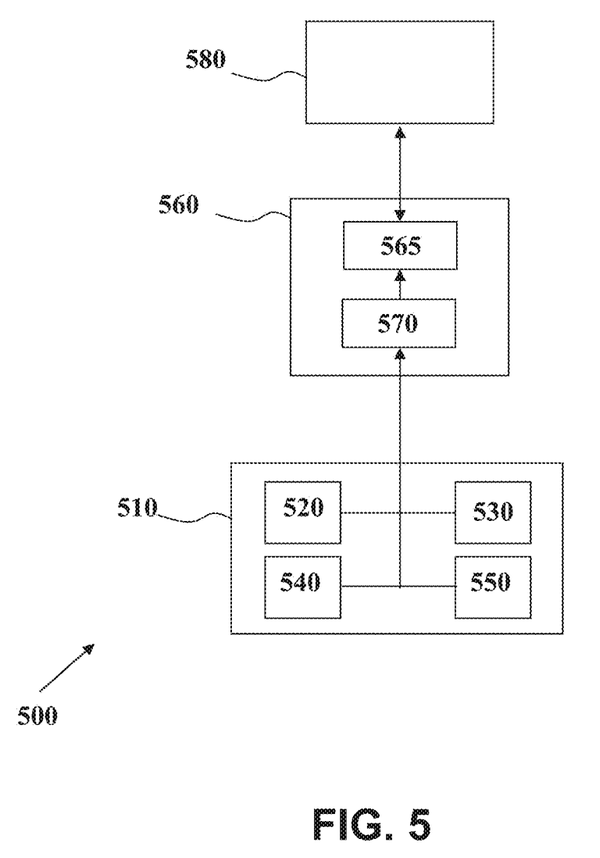
FIG. 5 is a schematic block diagram of a system according to an embodiment of the invention.

Referring now to FIG. 5, there is shown a schematic block diagram of system 500 according to an embodiment of the invention. The system 500 comprises a computer system 510 having first to fourth detectors 520-550 adapted to generate first to fourth performance metric signals, respectively. Each performance metric signal represents the variation of a performance metric of the computer system 510 over predetermined time period. The system 500 also comprises a processing unit 560 having a quantizing module 565 and a data analysis module 570.

The first to fourth performance metric signals are provided form the first to fourth detectors 520-550 to the quantizing module 565 of the processing unit 560.

The quantizing module 565 is adapted to transform the first to fourth performance metric signals into first to fourth binary signals, respectively, wherein the value a binary signal (at a time Tn) indicates whether or not a value of the respective performance metric signal indicates the occurrence or non-occurrence (at time Tn). Such transformation of a performance metric signal into a binary signal may be undertaken by the quantizing module 565 by analyse the performance metric signal and outputting a value of '1'/ 'Logical High' or '0'/'Logical Low' depending on whether an anomaly is detected or not. For example, the quantizing module 565 may be arranged to output a value of '1'/ 'Logical High' only if an anomaly is detected, otherwise a value of '0'/'Logical Low' is output, resulting in a binary signal that indicates the occurrence of an anomaly by having a value of '1'/'Logical High'.

The quantizing module 565 provides the generated first to fourth binary signals to the data analysis module 570 of the processing unit 560. The data analysis module 570 compares the binary signals for a user-defined time window, wherein it is considered that anomalies occurring within that time are overlapping or occur simultaneously. For example, for signals obtained over a one hour period, a one minute time window length may be used wherein it would be considered that anomalies occurring in the same one minute window occurred 'simultaneously'. Of course, other time window length may be used to detect simultaneously occurring anomalies. By way of example, a time window length of less than one second may be employed to detect anomalies that occurred at the same time.

Based on the comparison results, the data analysis module 570 determines if any relationship(s) exist between signals. For example, where it is identified that first and second binary signals changed from a value of '0'/'Logical Low' to a value of '1'/'Logical High' within a predetermined time window, the data analysis module 570 may be determine that the first and second binary signal are related and it may be further determined which signal is dependent on which by analysing which signal was the first to change from a value of '0'/'Logical Low' to a value of '1'/'Logical High'.

After determining the relationship(s) between the signals, the data analysis module 560 provides an output signal to a user interface 580 which generates a graphic representation of the relationships indicated by the output signal.

It will be clear to one of ordinary skill in the art that all or part of the method of one embodiment of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, e.g. a CD-ROM, DVD, USB stick, memory card, network-area storage device, internet-accessible data repository, and so on, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In one alternative, one embodiment may be realized in the form of a computer implemented method of deploying a service comprising steps of deploying computer program code operable to cause the computer system to perform all the steps of the method when deployed into a computer infrastructure and executed thereon.

In a further alternative, one embodiment may be realized in the form of a data carrier having functional data thereon, the functional data comprising functional computer data structures to, when loaded into a computer system and operated upon thereby, enable the computer system to perform all the steps of the method.

The flowchart and block diagram in the above figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments have been illustrated in detail, one of ordinary skill in the art will appreciate that modifications and adaptations to those embodiments may be made.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method of identifying an inter-relationship between performance metrics of a computer system, the method comprising steps of:
   obtaining a first metric signal for a first performance metric, the first metric signal representing a variation of the first performance metric over time;
   obtaining a second metric signal for a second performance metric, the second metric signal representing a variation of the second performance metric over time;
   converting the first metric signal into a first quantized signal having a first set of allowable discrete values;
   converting the second metric signal into a second quantized signal having a second set of allowable discrete values;
   detecting a correlation between the first and second quantized signals based on a timing of variations in the first and second quantized signals; and
   identifying an inter-relationship between the first and second performance metrics based on the detected correlation between the first and second quantized signals.

2. The method of claim 1, wherein the first and second metric signals represent a variation of the first and second performance metrics, respectively, over a common time period.

3. The method of claim 1, wherein the first set of allowable discrete values consists of first and second values and wherein converting the first metric signal into a first quantized signal comprises approximating a value of the first metric signal at a time instant to the second value if it exceeds a predetermined threshold.

4. The method of claim 1, wherein at least one of the first and second performance metrics comprise a user-definable key performance indicator (KPI), and the inter-relationship identification is a pre-cursor to an occurrence of an anomaly occurring in the KPI.

5. The method of claim 1, further comprising a step of:
   generating a graphical representation of the identified inter-relationship between the first and second performance metrics.

6. The method of claim 1, further comprising:
   generating a notification of an abnormality in an operation of the computer system based on the inter-relationship identification.

7. The method of claim 1, wherein the first quantized signal is a binary signal that indicates whether or not an anomaly exists in the first metric signal, and the second quantized signal is another binary signal that indicates whether or not an anomaly exists in the second metric signal.

8. The method of claim 1, wherein a number of allowable discrete values for the first set of allowable discrete values is greater than two, and wherein the first quantized signal further indicates a severity of an anomaly of the first metric signal.

9. The method of claim 1, wherein detecting the correlation between the first and second quantized signals comprises:
   comparing the first quantized signal with the second quantized signal by identifying timing of variations in the first and second quantized signals and assessing a temporal proximity to one another.

10. The method of claim 1, wherein the first and second metric signals are continuous analog signals.

11. The method of claim 3, wherein the threshold value indicates an occurrence of an anomaly.

12. A method of monitoring a computer system comprising steps of:
   identifying an inter-relationship between first and second performance metrics of the computer system;
   determining a dependency between the first and second performance metrics based on the identified inter-relationship between the first and second performance metrics; and
   based on the determined dependency, monitoring only one of the first and second performance metrics to detect an occurrence of an anomaly in the monitored performance metric.

13. The method of claim 12, further comprising steps of:
   detecting the occurrence of an anomaly in the monitored performance metric; and communicating a signal warning of potential abnormality occurrence in the other performance metric.

14. A computer program product for identifying an inter-relationship between performance metrics of a computer system, wherein the computer program product comprises a non-transitory computer-readable storage medium having computer-readable program code embodied therewith, the computer-readable program code configured to perform all of the steps of claim 1.

15. A system comprising:
a computer system;
a first detection unit adapted to obtain a first metric signal for a first performance metric of the computer system, the first metric signal representing a variation of the first performance metric over time;
a second detection unit adapted to obtain a second metric signal for a second performance metric of the computer system, the second metric signal representing a variation of the second performance metric over time;
a quantizing unit adapted to convert the first metric signal into a first quantized signal having a first set of allowable discrete values and to convert the second metric signal into a second quantized signal having a second set of allowable discrete values; and
a data analysis unit adapted to detect a correlation between the first and second quantized signals based on a timing of variations in the first and second quantized signals, and to identify an inter-relationship between the first and second performance metrics based on the detected correlation between the first and second quantized signals.

16. The system of claim 15 wherein the first and second metric signals represent a variation of the first and second performance metrics, respectively, over a common time period.

17. The system of claim 15, wherein the first set of allowable discrete values consists of first and second values and wherein the quantizing unit is adapted to convert the first metric signal into a first quantized signal by approximating a value of the first metric signal at a time instant to the second value if it exceeds a predetermined threshold.

18. The system of claim 15, wherein at least one of the first and second performance metrics comprise a user-definable key performance indicator (KPI), and the inter-relationship identification is a pre-cursor to an occurrence of an anomaly occurring in the KPI.

19. The system of claim 15, further comprising a graphics processing unit adapted to generate a graphical representation of the identified inter-relationship between the first and second performance metrics.

20. The system of claim 15, wherein the data analysis unit is further adapted to determine a dependency between the first and second performance metrics based on the identified inter-relationship between the first and second performance metrics,
and wherein the system is further adapted to, based on the determined dependency, monitor only one of the first and second performance metrics to detect an occurrence of an anomaly in the monitored performance metric.

* * * * *